(12) United States Patent
Fukazawa et al.

(10) Patent No.: US 6,952,299 B1
(45) Date of Patent: Oct. 4, 2005

(54) ELECTROCHROMIC DEVICE

(75) Inventors: Akihiko Fukazawa, Fujieda (JP); Chihiro Minami, Fujieda (JP)

(73) Assignee: Murakami Corporation, Shizuoka (JP)

( * ) Notice: Subject to any disclaimer, the term of this patent is extended or adjusted under 35 U.S.C. 154(b) by 55 days.

(21) Appl. No.: 10/401,894

(22) Filed: Mar. 31, 2003

(30) Foreign Application Priority Data

Aug. 29, 2002 (JP) ........................................ 2002-251856

(51) Int. Cl.[7] .............................. G02F 1/153; G02B 5/23
(52) U.S. Cl. ...................................... 359/275; 252/586
(58) Field of Search ............................ 359/265, 267, 359/269, 270–273, 275; 252/500, 583, 586, 600

(56) References Cited

U.S. PATENT DOCUMENTS

| | | | | |
|---|---|---|---|---|
| 5,721,633 A | * | 2/1998 | Nagai et al. | 359/274 |
| 5,724,187 A | * | 3/1998 | Varaprasad et al. | 359/608 |
| 6,011,642 A | | 1/2000 | Vink et al. | |
| 6,266,177 B1 | * | 7/2001 | Allemand et al. | 359/265 |
| 2002/0054419 A1 | | 5/2002 | Beteille et al. | |
| 2003/0227664 A1 | * | 12/2003 | Agrawal et al. | 359/269 |

FOREIGN PATENT DOCUMENTS

WO    WO 02/12954 A1    2/2002

OTHER PUBLICATIONS

Cantao et al. "Inorganic Oxide Solid State Electrochromic Devices" Materials Science and Engineering, vol. B26, Sep. 1994, pp. 157–161.

* cited by examiner

Primary Examiner—Georgia Epps
Assistant Examiner—William Choi
(74) Attorney, Agent, or Firm—Oblon, Spivak, McClelland, Maier & Neustadt, P.C.

(57) ABSTRACT

The present invention provides an electrochromic device in which a color during the coloring mode is gray. A lower ITO transparent electrode film 12 constituting a lower electrode film is formed on a transparent glass substrate 10. On the lower ITO transparent film 12, a nickel oxides film 32 constituting an oxidation coloring layer, a tantalum oxide film 16 constituting a solid-state electrolyte layer, a mixture film 34 of tungsten oxide and titanium oxide constituting a reduction coloring layer and an lower ITO transparent electrode film 20 constituting a upper electrode film are formed sequentially. The color during the coloring mode is gray and the color during the bleaching mode is achromatic.

25 Claims, 18 Drawing Sheets

ELECTROCHROMIC DEVICE

BACKGROUND OF THE INVENTION

1. Field of the Invention

The present invention relates to an electrochromic (hereinafter, referred to as EC) device in which the color during the coloring mode has been realized that the color is gray.

2. Description of the Related Art

The EC device is a device for reversibly executing the coloring and the bleaching using EC phenomenon, and is used for a dimming rearview mirror, a dimming glass, a display device and the like. An example of a section of the laminated structure of the conventional EC device is shown in FIG. 2. In this example, the entire device is constructed to be transparent. An ITO (Indium Tin Oxide) transparent electrode film 12, constituting a lower electrode film, is formed on a transparent glass substrate 10; and a mixture film 14 of iridium oxide and tin oxide constituting an oxidation coloring layer, a tantalum oxide film 16 constituting a solid-state electrolyte layer, a tungsten oxide film 18 constituting a reduction coloring layer and an ITO transparent electrode film 20 constituting an upper electrode film are sequentially formed on the ITO transparent electrode film 12. An end portion of the lower ITO transparent electrode film 12 is previously provided with a partition 22 using a laser etching and an area 12a of the end portion is electrically isolated. An end portion of the upper ITO transparent electrode film 20 is electrically connected to the isolated area 12a of the lower ITO transparent electrode film 12. Both end portions of the substrate 10 are provided with clip electrodes 24, 26 for drawing electrodes. The clip electrode 24 is electrically connected to the lower ITO transparent electrode film 12 and the clip electrode 26 is electrically connected to the upper ITO transparent electrode film 20. A transparent sealing resin 28 is applied on the upper ITO transparent electrode film 12 and a transparent glass plate is adhered thereon as a transparent sealing member 30. Thus the laminated structure is sealed. According to the above construction, when voltage is applied to the clip electrode 24 as a positive polarity and to the clip electrode 26 as a negative polarity, both of the oxidation coloring layer 14 and the reduction coloring layer 18 are colored, and when the reverse voltage is applied (or short-circuited), both coloring layers 14 and 18 are bleached.

In a conventional EC device, the colors during the coloring mode for the mixture film 14 of iridium oxide and tin oxide are all blue and the color of the entire device is also blue. For this reason, the conventional EC device could not be provided in use when the color is important (that is, when it is not desired that variation in color is made in an image obtained through the EC device). For example, the digital camera now in use has a ND (Neutral Density) filter built-in and is constructed to dim the light by moving the ND filter to a front surface of an image pickup device such as a CCD (Charge Coupled Device) by means of a motor when the amount of incident light is great. Since a motor is not required in the case of dimming light by replacing the ND filter with the EC device, it is possible to reduce the size and lower the power consumption of the digital camera. However, since in the conventional EC device, the color during the coloring mode is blue so that the color of the picked-up image exhibits blue-based colors and it is difficult to balance the white color, the EC device can not be used in place of the ND filter.

SUMMARY OF THE INVENTION

The present invention is explained in consideration of the aforementioned problems and an objective of the present invention is to provide an EC device in which it has been realized that the color during the coloring mode is gray.

The present invention provides an electrochromic device having a structure that a reduction coloring layer and an oxidation coloring layer face down and face up respectively to the electrolyte layer (which includes various electrolytes in solid, liquid, and gel), wherein the reduction coloring layer is made of a material containing tungsten oxide and titanium oxide, the oxidation coloring layer is made of a material containing nickel oxides, and the color during the coloring mode is gray (not limited to a pure gray color of which the spectral characteristic is almost even in the visible light area, but including colors that can be recognized as gray colors with the human eye. It is the same all over this specification). According to the present invention, by making the reduction coloring layer out of a material containing tungsten oxide and titanium oxide and, by making the oxidation coloring layer out of a material containing nickel oxides, the gray color is obtained as the color during the coloring mode. Furthermore, the achromatic color (not limited to a pure achromatic color of which the spectral characteristic is almost even in the visible light area, but including colors that can be recognized as achromatic colors with the human eye. It is the same all over this specification) is obtained as the color during the bleaching mode.

Furthermore, the present invention provides an electrochromic device which a first electrode layer, a reduction coloring layer, an electrolyte layer (includes various electrolytes in solid, liquid and gel), an oxidation coloring layer and a second electrode layer are laminated between two sheets of plate members, and in which at least one of combinations of the plate member and electrode layer of two sheet of the plate members and said two electrode layers is transparent, wherein the reduction coloring layer is made of a material containing tungsten oxide and titanium oxide, the oxidation coloring layer is made of a material containing nickel oxides, and a color during the coloring mode is gray. This EC device may be arranged as an exposure control element on an optical axis of an image pickup device in a digital camera, by making all of the two sheets of plate members and the two electrode layers transparent and making the entire device transparent in a thickness direction. Furthermore, a combination of the plate member and the electrode layer of said two sheets of plate members and said two electrode layers is transparent and the electrode layer on the other side is formed as a metal reflecting film, as a result, a reflectivity variable mirror may be constituted.

Furthermore, the present invention provides an electrochromic device comprising: a base member; a first electrode layer fixed on the base member; an oxidation or reduction coloring layer fixed on the first electrode layer; a solid-state electrolyte layer fixed on the oxidation or reduction coloring layer; a reduction or oxidation coloring layer fixed on the electrolyte layer; and a second electrode layer fixed on the reduction or oxidation coloring layer, in which at least one of the first and second electrode layers is constructed to be transparent, wherein the reduction coloring layer is made of a material containing tungsten oxide and titanium oxide, the oxidation coloring layer is made of a material containing nickel oxides, and a color during the coloring mode is gray. By doing so, a complete solid-state EC device is formed. When making the solid-state electrolyte layer is made of inorganic materials, the solid-state electrolyte layer may contain, for example, $Ta_2O_5$ as the main component. This complete solid-state EC device may be adapted for various uses as follow.

(a) Dimmer Device

The base member is made of a transparent plate-shaped member, such as a transparent glass plate, the first and second electrode layers are made of transparent electrode films such as ITO, and a transparent plate-shaped sealing member, such as a transparent glass plate is adhered onto the second electrode layer using a transparent sealing resin, so that the entire device made transparent in a thickness direction. By doing so, a dimmer device (transmittance-variable element) of which the color during the coloring mode is gray may be formed. This dimmer device may be constructed as, for example, an exposure adjusting element (an ND filter or an iris) for a camera, sunglasses, a dimming glass or a sunroof. In any case, the intensity of light can be adjusted without changing the color of the transmitting light.

(b) Reflectivity Variable Mirror

The base member is made of a transparent plate-shaped member, such as a transparent glass plate, the first electrode layer is made of a transparent electrode film such as ITO, the second electrode layer is made of a metal reflecting film and a sealing member is adhered onto the second electrode layer using a sealing resin. By doing so, a reflectivity-adjustable mirror is formed in which the base member is a front surface and in which the color during the coloring mode is gray.

Otherwise, the first electrode layer is made of a metal reflecting film, the second electrode layer is made of a transparent electrode film such as ITO and a transparent plate-shaped sealing member such as a transparent glass plate is adhered onto the second electrode layer using a transparent sealing resin. By doing so, a reflectivity variable mirror is constituted in which the transparent plate-shaped sealing member is a front surface and the color during the coloring mode is gray.

(c) Display Device

The base member is made of a transparent plate-shaped member, such as a transparent glass plate, the first and second electrode layers are made of transparent electrode films such as ITO, and an opaque background member such as a white glass plate is adhered onto the second electrode layer using a transparent sealing resin. By doing so, a display device is formed in which the base member is a front surface and the color displayed is gray.

Otherwise, the base member is made of an opaque background member such as a white glass plate, the first and second electrode layers are made of transparent electrode films such as ITO and a transparent plate-shaped sealing member such as a transparent glass plate is adhered onto the second electrode layer using a transparent sealing resin. By doing so, a display device is formed in which the transparent plate-shaped sealing member is a front surface and in which the color displayed is gray.

BRIEF DESCRIPTION OF THE DRAWINGS

The above and other objects, advantages and features of the present invention will become apparent from the following description of preferred embodiments given in conjunction with the accompanying drawings, in which:

FIG. 12 is a schematic view illustrating a section of the laminated structure in the EC device according to the fifth embodiment of the present invention;

FIG. 16 is a schematic view illustrating a method of manufacturing the EC device of the eighth embodiment;

DESCRIPTION OF THE PREFERRED EMBODIMENTS (First Embodiment)

Figure 1:
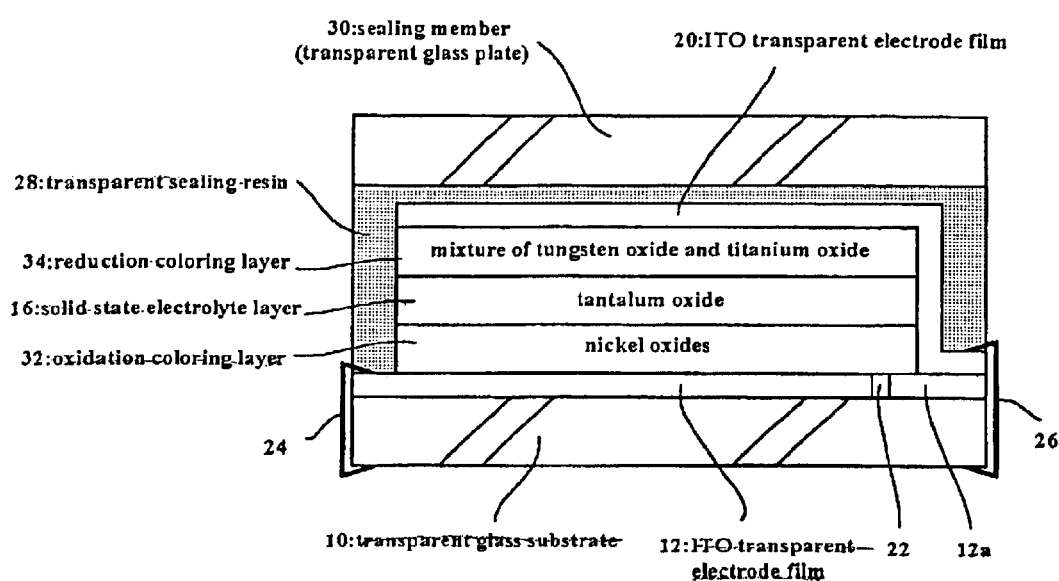
FIG. 1 is a schematic view illustrating a section of the laminated structure of the EC device according to a first embodiment of the present invention.

A first embodiment of the EC device according to the present invention is shown in FIG. 1. The same reference numerals are employed in portions equal to those in the conventional structure shown in FIG. 2. An ITO transparent electrode film 12 constituting a lower electrode film is formed on a transparent glass substrate 10; and a nickel oxides film 32 constituting an oxidation coloring layer, a tantalum oxide film 16 constituting a solid-state electrolyte layer, a mixture film 34 of tungsten oxide and titanium oxide constituting a reduction coloring layer and an ITO transparent electrode film 20 constituting an upper electrode film are sequentially formed on the ITO transparent electrode film 12. An end portion of the lower ITO transparent electrode film 12 is provided in advance with a partition 22 using a laser etching, and an area 12a of the end portion is electrically isolated. An end portion of the upper ITO transparent electrode film 20 is electrically connected to the isolated area 12a of the lower ITO transparent electrode film 12. Both end portions of the substrate 10 are provided with clip electrodes 24, 26 for drawing electrodes. The clip electrode 24 is electrically connected to the lower ITO transparent electrode film 12 and the clip electrode 26 is electrically connected to the upper ITO transparent electrode film 20. A transparent liquid-state sealing resin 28 is applied on the upper ITO transparent electrode film 12, a transparent glass plate as a transparent sealing member 30 is adhered thereon and then the liquid-state sealing resin 28 is cured to seal the entire laminated structure. In the construction above, all of the EC device shown in FIG. 1 is constructed to be transparent in a thickness direction.

According to the EC device shown in FIG. 1, when voltage is applied to the clip electrode 24 as positive polarity and to the clip electrode 26 as negative polarity, both of the oxidation coloring layer 32 and the reduction coloring layer 34 are colored, and when the reverse voltage is applied (or when short-circuited), both coloring layers 32 and 34 are bleached. The chemical reactions in the respective layers during the coloring mode and bleaching are, for example, as follows.

(Formula 6)

An example of a method of manufacturing the EC device shown in FIG. 1 will be sequentially described.

(1) The transparent glass substrate 10 upon which the ITO transparent electrode film 12 is formed is prepared and cut to a desired shape. Then, the transparent glass substrate 10 cut to the desired shape is prepared and then the ITO transparent electrode film 12 is formed.

(2) The partition 22 is formed through the laser-etching for the transparent glass substrate 10.

(3) The substrate 10 is placed inside a vacuum chamber of the vacuum evaporation apparatus and then by means of the vacuum evaporation method which uses NiO or Ni as a evaporating material (starting material), the nickel oxides film 32 is formed. When Ni is used as the evaporating material, the vaporized Ni is combined with oxygen in the vacuum chamber and becomes the nickel oxides.

(4) Subsequently, through the use of a vacuum evaporation method which uses $Ta_2O_5$ as the evaporating material (accurately, ion plating method in which HF power is applied), the tantalum oxide 16 is formed.

Figure 3:
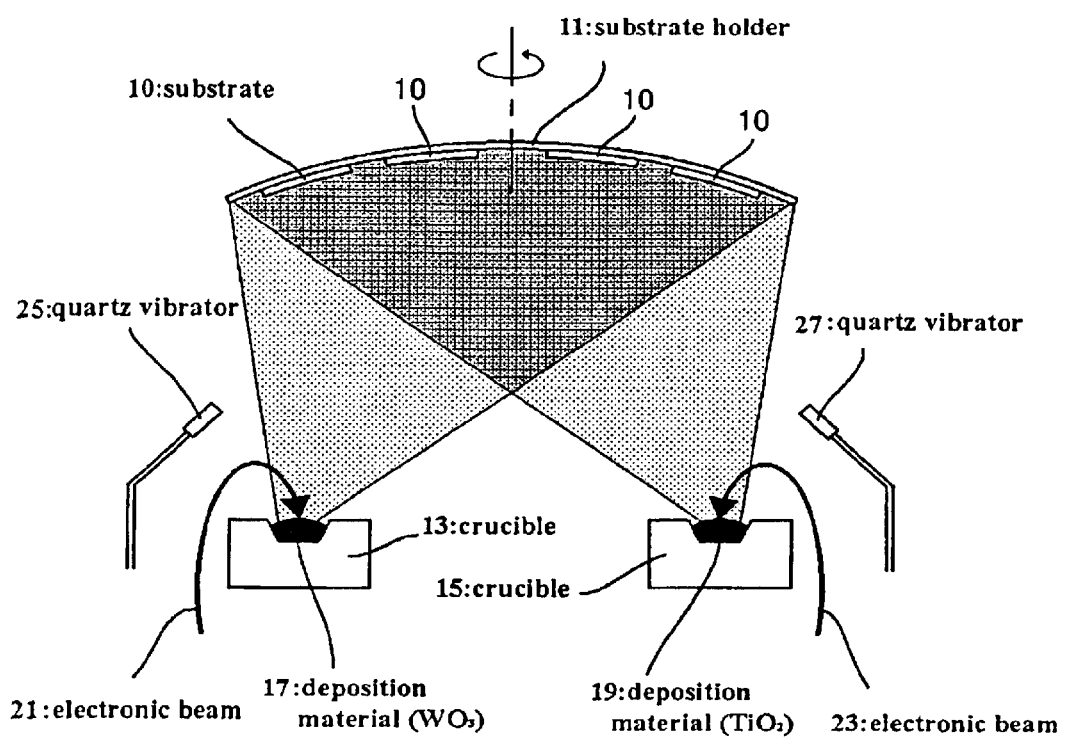
FIG. 3 is a schematic view illustrating an example for arranging the respective devices in a vacuum evaporation apparatus when a mixture film of the tungsten oxide and the titanium oxide are formed by means of a dual vacuum evaporation method.

(5) Subsequently, through the use of the dual vacuum evaporation method which uses $WO_3$ and $TiO_2$ as the evaporating materials, the mixture film 34 of tungsten oxide and titanium oxide is formed. An example for arranging the respective devices in the vacuum evaporation apparatus when the dual vacuum evaporation is carried out is shown in FIG. 3. A plurality of substrates 10 in which the film formation has been executed up to the tantalum oxide film 16 is held on the lower surface of a rotating substrate holder 11 with the film forming face downward. Below the substrate holder 11, crucibles 13, 15 are deposed. In the crucible 13, $WO_3$ is contained as the evaporating material 17. In the crucible 15, $TiO_2$ is contained as the evaporating material 19. The evaporating materials 17, 19 are heated and vaporized by means of irradiation of the electronic beams 21, 23, respectively. The vaporized evaporating materials 17, 19 rise and are mixed to be deposited on the substrate 10 and form the mixture film 34 of tungsten oxide and titanium oxide. With an upward incline of the crucibles 13, 15, quartz vibrators 25, 27 are arranged as the film thickness meters. Through variation in the vibrating frequency of the quartz vibrator 25, the vaporizing velocity of the evaporating material 17 is monitored. Through variation in the vibrating frequency of the quartz vibrator 27, the vaporizing velocity of the evaporating material 19 is monitored. By adjusting the output of the electron beams 21, 23 in accordance with the vaporizing velocity of the evaporating materials 17, 19 to be monitored, the mixture ratio of tungsten oxide and titanium oxide in the mixture film 34 of tungsten oxide and titanium oxide is adjusted to a predetermined value. Further, the series of film formation processes (3) to (5) can be successively carried out by sequentially varying the vaporizing source and the film forming conditions while the substrate 10 is held on the substrate holder 11 and remains in the vacuum chamber.

(6) The substrate 10 is removed from the vacuum chamber one time and return to the vacuum chamber after exchanging a mask pattern, and the upper ITO transparent electrode film 20 is formed thereon using the vacuum evaporation method which uses ITO as the evaporating material (accurately, the ion plating method in which HF power is applied). Further, in the above film formation processes (3) to (6), the formation of the tantalum film 16 in the process (4) is carried out using the ion plating method in which HF power of 600 W is applied, and the formation of the upper ITO transparent electrode film 20 in the process (6) is carried out using the ion plating method in which HF power of 400 W is applied. In the other processes (3) and (5), the film formation is carried out without the application of HF power. Specifically, when the formation of the nickel oxides film 32 in the process (3) has been carried out using the ion plating method which applies HF power and uses an NiO pellet as the starting material, it is understood that the colored nickel oxides film is formed in advance and thus it is preferable not to apply HF power (an achromatic and transparent nickel oxides film can be formed).

(7) When the film formation processes are completed, the substrate 10 is removed from the vacuum chamber and then provided with the clip electrodes 24, 26.

(8) The transparent liquid-state sealing resin 28 is applied, the transparent glass plate is adhered as the sealing member 30 and then the liquid-state sealing resin 28 is cured to complete the EC device.

The measured characteristics of the EC device shown in FIG. 1 manufactured through the above manufacturing processes will be described. In this measurement, a square sample of 4 cm was used. The film thickness of each layer was as follows: the ITO transparent electrode film 12 was about 250 nm, the nickel oxides film 32 was about 100 nm, the tantalum oxide film 16 was about 600 nm, the mixture film 34 of tungsten oxide and titanium oxide was about 500 nm, and the ITO transparent electrode film 20 was about 250 nm. Further, the forming conditions of the nickel oxides film 32, the tantalum oxide film 16 and the mixture film 34 of tungsten oxide and titanium oxide were as follows: The nickel oxides film 32 was formed in condition that NiO having a purity of 99.9% or more was used as the evaporating material, a substrate temperature was 120° C., a partial pressure of oxygen was $3 \times 10^{-4}$ torr and a film forming velocity was 0.75 nm/sec. The tantalum oxide film 16 was formed in condition that $Ta_2O_5$ having a purity of 99.9% or more was used as the evaporating material, a substrate temperature was 120° C., a partial pressure of oxygen was $3 \times 10^{-4}$ torr and a film forming velocity was 0.67 nm/sec. The mixture film 34 of tungsten oxide and titanium oxide was formed under the condition that both of $WO_3$ and $TiO_2$ having purity of 99.9% or more was used as the evaporating materials, a substrate temperature was 120° C. and a partial pressure of oxygen was $1.6 \times 10^{-4}$ torr. Furthermore, the vaporizing velocity ratio of $WO_3$ and $TiO_2$ was set according to the desired mixture ratio of tungsten oxide and titanium oxide. For example, a ratio (at %: atomic percentage) of the number of titanium atoms to the sum of the numbers of tungsten atoms and titanium atoms contained in the mixture film 34 of tungsten oxide and titanium oxide was set to W:Ti=72:28, the vaporizing velocity ratio (velocity ratio at which the thickness measured by the quartz vibrators 25, 27 was increased) $WO_3$ and $TiO_2$ was set to about 3:2.

The nickel oxides film 32 of the EC device manufactured was crystalline (polycrystalline). The mixture film 34 of tungsten oxide and titanium oxide was amorphous. Although a part of NiO might be converted into other nickel oxides (such as $Ni(OH)_2$, $Ni_2O_3$, NiOOH etc.) during evaporation of NiO, it is understood that in any case, the nickel oxides film 32 contains NiO as its main component. Similarly, although a part of $WO_3$ might be converted into other tungsten oxide (tungsten oxides) and a part of $TiO_2$ might be converted into other titanium oxide (titanium oxides) during the dual evaporation of $WO_3$ and $TiO_2$, it is understood that in any case, the mixture film 34 of tungsten oxide and titanium oxide contains $WO_3$ and $TiO_2$ as their main components. Further, it is understood that the EC phenomenon occurs even though the nickel oxides film 32 is in any of crystal, micro crystal or amorphous. Since the efficiency during the coloring mode and bleaching is lowered when the mixture film 34 of tungsten oxide and titanium oxide is crystallized, it is preferable that the film is amorphous.

Figure 4:
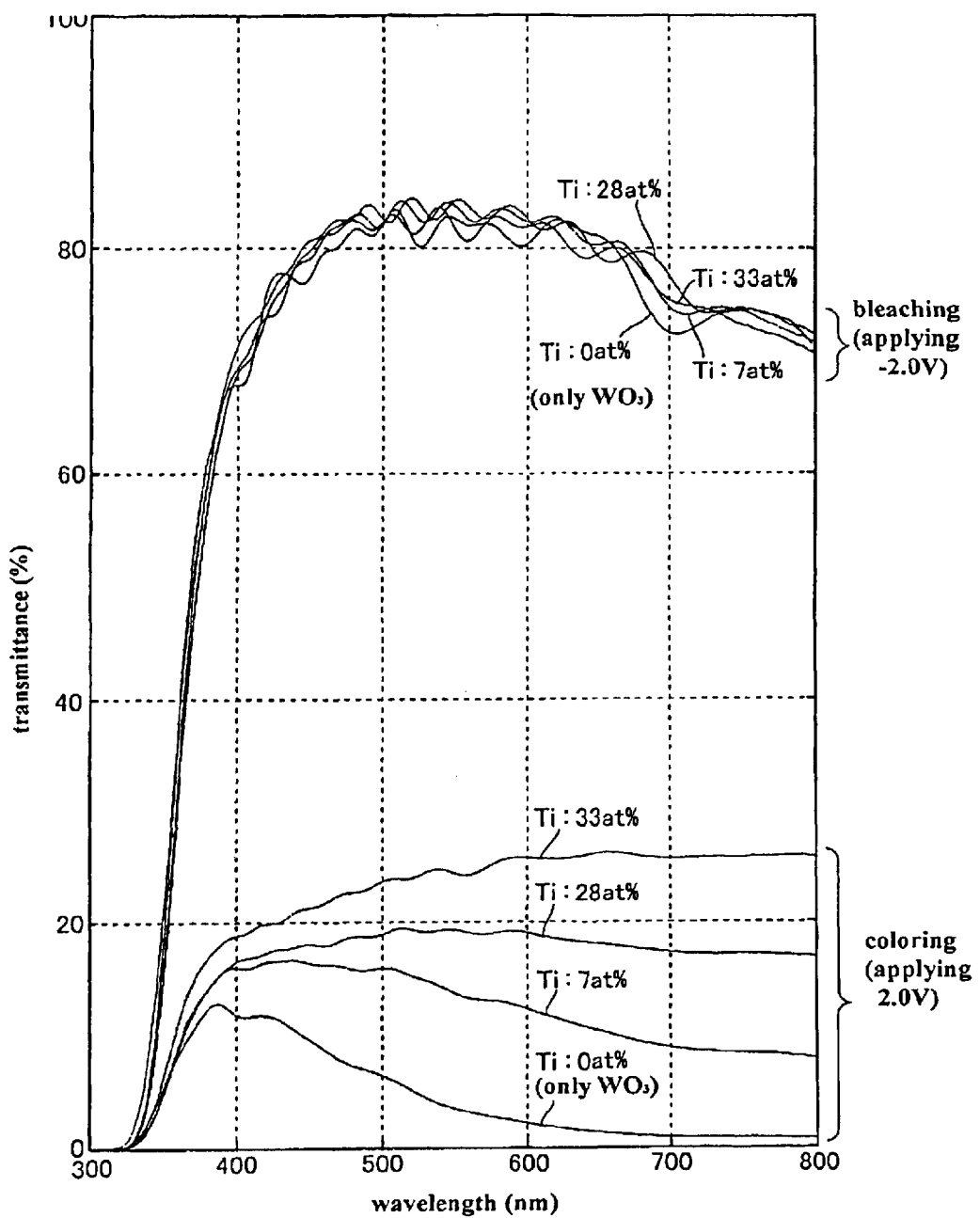
FIG. 4 is a view illustrating the spectral transmittance characteristic when the mixture ratio of tungsten oxide and titanium oxide in the reduction coloring layer in the EC device of FIG. 1 is varied.

The spectral transmittance characteristic, when the mixture ratio of tungsten oxide and titanium oxide of the reduction coloring layer 34 in the EC device shown FIG. 1 is varied is shown in FIG. 4. The ratio value (at %) of Ti shown in FIG. 4 means the ratio of the number of titanium atoms to the sum of the number of tungsten atoms and titanium atoms contained in the mixture film 34 of tungsten oxide and titanium oxide, which is measured by the X-ray photoelectron spectroscopy (ESCA). Further, in FIG. 4, the characteristics were measured after the voltage of 2.0V was applied for 90 seconds during the coloring mode. The characteristics were measured after the voltage of −2.0V was applied for 90 seconds during the bleaching mode. Referring to FIG. 4, it can be understood that specifically the long wavelength side of the spectral characteristic is varied in accordance with the mixture ratio of tungsten oxide and titanium oxide during the coloring mode, the level on the long wavelength side is lowered as $TiO_2$ decrease such that the blue color becomes darker, and the level on the long wavelength side is heightened as $TiO_2$ increase such that the blue color become lighter. Furthermore, when the ratio of the number of titanium atoms is within a range of 5 to 40 at % (that is, the ratio of the number of W atoms and Ti atoms is W:Ti=95:5 to 60:40), the color gray is displayed. Specifically, when the ratio of the number of titanium atoms is within a range of 20 to 30 at % (that is, the ratio of the number of W atoms and Ti atoms is W:Ti=80:20 to 70:30), the spectral characteristic is almost even in the visible light area (400 to 800 nm) and almost pure gray is obtained. Additionally, during the bleaching mode, difference in the spectral characteristic in accordance with the mixture ratio of $TiO_2$ is small and the transmittance at a peak (wavelength is 550 nm) of visibility for human beings is 80% or more (the average transmittance of the entire visible light area is 80%), so that most of the transparent transmitting color can be obtained as an achromatic color.

Figure 5:
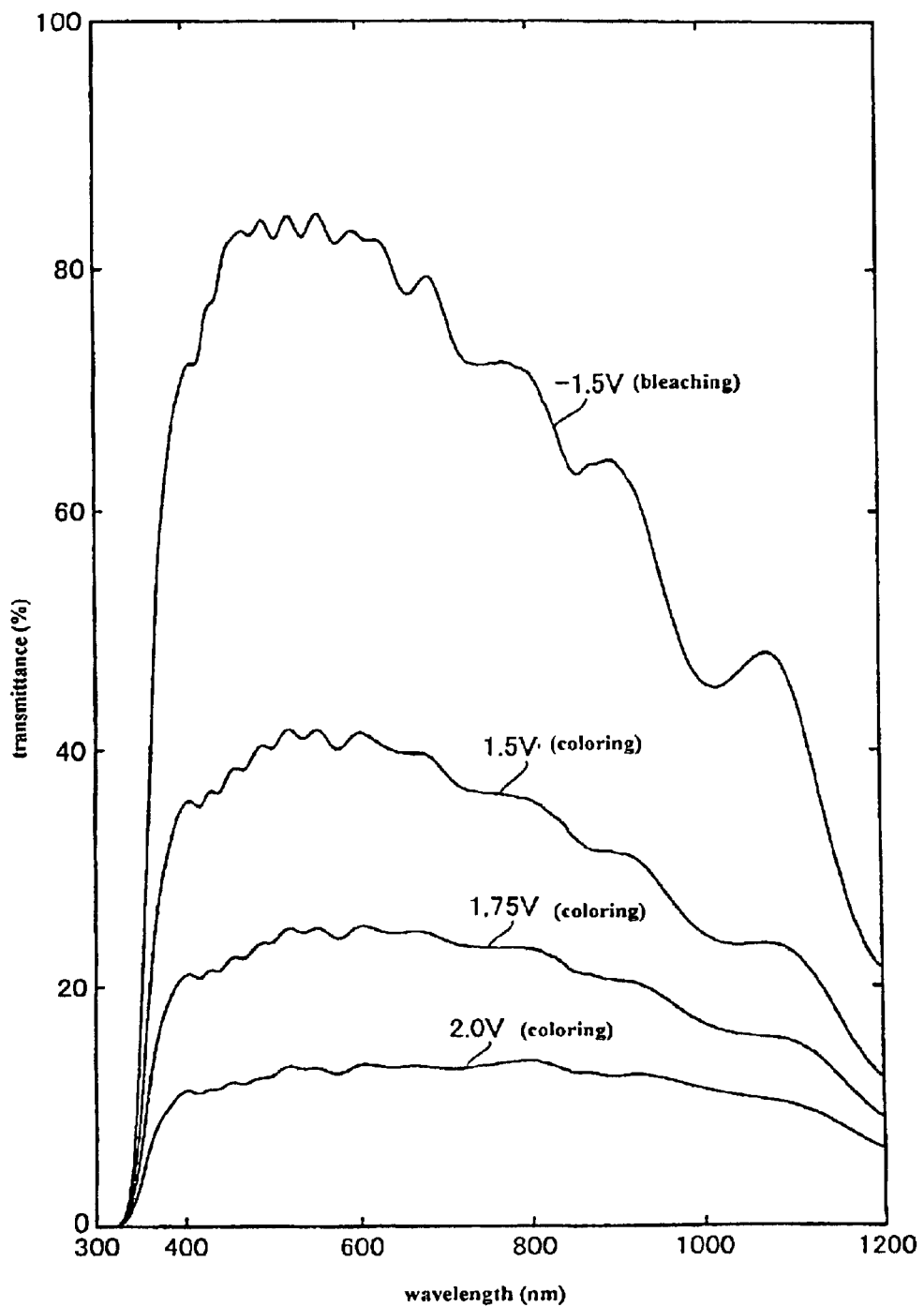
FIG. 5 a view illustrating the spectral transmittance characteristic when voltage applied during the coloring mode in the EC device of FIG. 1 is varied.

Next, FIG. 5 shows the spectral transmittance characteristic in the EC device shown in FIG. 1, when the coloring voltage is varied and the spectral transmittance characteristic when the bleaching voltage is applied. Further, in the measurement of FIG. 5, the ratio of the number of titanium atoms contained in the mixture film 34 of tungsten oxide and titanium oxide was set to 28 at % (the ratio of the number of W atoms and Ti atoms is W:Ti=72:28). Furthermore, during the coloring mode, the characteristic was measured after the coloring voltage was applied for 90 seconds. During the bleaching mode, the characteristic was measured after the bleaching voltage of −1.5V was applied for 90 seconds. Referring to FIG. 5, during the coloring mode, it can be understood that the transmittance is lowered as the coloring voltage increase and the characteristic is even in the visible light area such that the blue color become lighter. When the bleaching voltage was greater than 1.75V, the color during the coloring mode becomes darker. More specifically, when the coloring voltage is 2V or more, the transmittance is lowered to almost 10% or less in almost all of the visible light area and the characteristic becomes even, so that almost a pure gray color is obtained. Therefore, the peak value of voltage applied during the coloring mode is preferably 1.75V or more, and more preferably above 2V and below a withstand voltage. The characteristic during the bleaching mode is relatively even in the visible light area and almost all of the transparent transmitting color is obtained as the achromatic color. The transmittance during the bleaching mode is 80% or more at a peak of visibility for human beings.

Figure 6:
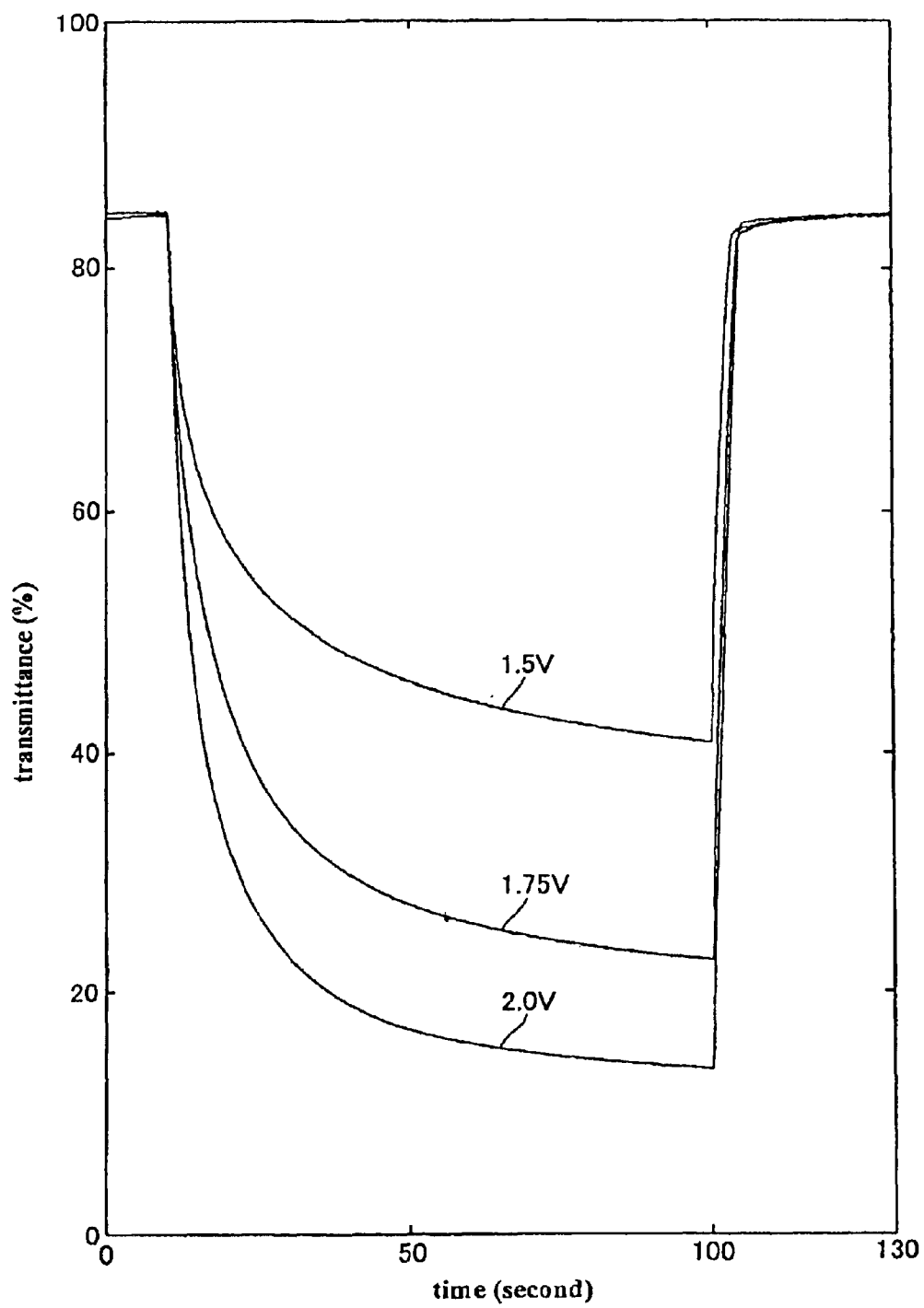
FIG. 6 is a view illustrating the response velocity characteristic during the coloring mode when the coloring voltage in the EC device of FIG. 1 is varied.

Next, FIG. 6 shows the response velocity characteristic during the coloring mode in the EC device shown FIG. 1, when the coloring voltage is varied. Further, in the measurement in FIG. 6, the ratio of the number of titanium atoms contained in the mixture film 34 of tungsten oxide and titanium oxide is set to 28 at %. Furthermore, the transmittance at the peak (wavelength: 550 nm) of visibility for human beings is measured. Referring to FIG. 6, the response velocity characteristic is varied in accordance with size of the device, and the response is fast as the size of device becomes smaller, and the response slow as the size of device becomes greater. When the device is used as an exposure adjusting element for a camera, the device size is relatively small and thus if the coloring voltage is 1.75V or more, it reaches the dark coloring concentration in a relatively short time.

Figure 2:
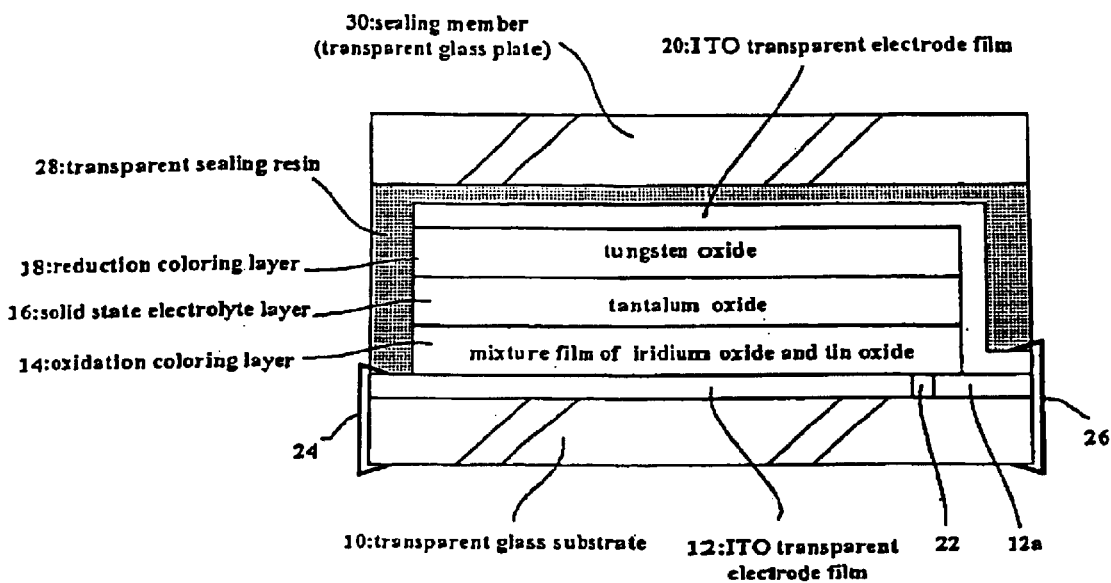
FIG. 2 is a schematic view illustrating a section of the laminated structure of a conventional EC device.
Figure 7:
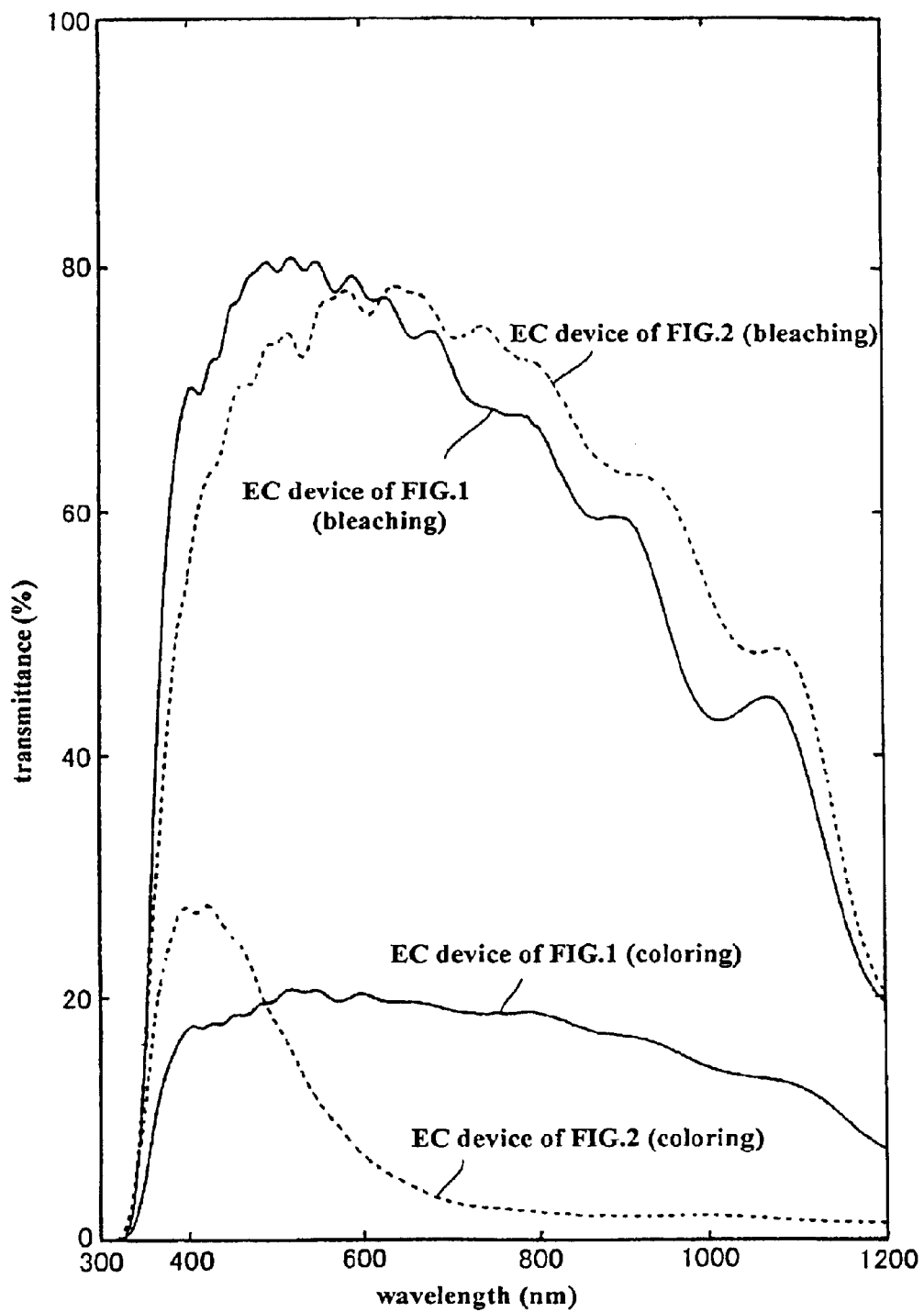
FIG. 7 is a view illustrating the spectral transmittance characteristics of the EC device of the present invention shown in FIG. 1 and the conventional EC device shown in FIG. 2.

Next, FIG. 7 shows the difference in the spectral transmittance characteristics of the EC device of the present invention shown in FIG. 1 and the conventional EC device shown in FIG. 2. Further, in the measurement of FIG. 7, as for the EC device shown in FIG. 1, the ratio of the number of titanium atoms contained in the mixture film 34 of tungsten oxide and titanium oxide is set to 28 at %. The coloring voltage of the EC device shown in FIG. 1 and the coloring voltage of the conventional EC device shown in FIG. 2, which are 2.0V and 1.5V, respectively, are applied for 30 seconds. The bleaching voltage of −1.5V is applied for 30 seconds in both cases. Referring to FIG. 7, during the coloring mode, the transmitting color of the conventional EC device shown in FIG. 2 is a considerably dark blue-based color, whereas the characteristic of the EC device shown in FIG. 1 is even in the visible light area and the color gray is obtained. Further, during the bleaching mode, the transmitting color of the conventional EC device shown in FIG. 2 had a high level near the yellow color and thus was yellow, whereas the transmitting color of the EC device shown in FIG. 1 was achromatic and almost transparent. Furthermore, as for the EC device shown in FIG. 1, the transmittance during the coloring mode was about 20% in almost the whole visible light area and the transmittance during the bleaching mode is about 80% at the peak of visibility for human beings. The value of 80% in transmittance was greater in comparison with the conventional EC device, and the transparency of the EC device shown in FIG. 1 was higher than that of the conventional EC device.

Furthermore, in the conventional structure shown in FIG. 2, only by replacing the material of the oxidation coloring layer 14 with nickel oxides (containing NiO as its main component), the color obtained during the coloring mode was not gray. Furthermore, only by replacing the material of the reduction coloring layer 18 with mixture of tungsten oxide and titanium oxide (containing $WO_3$ and $TiO_2$ as the main components), the color obtained during the coloring mode was not gray. By replacing the material of the oxidation coloring layer 14 with nickel oxides (containing NiO as its main component) and replacing the material of the reduction coloring layer 18 with mixture of tungsten oxide and titanium oxide (containing $WO_3$ and $TiO_2$ as the main components), the color obtained during the coloring mode was gray.

Figure 8:
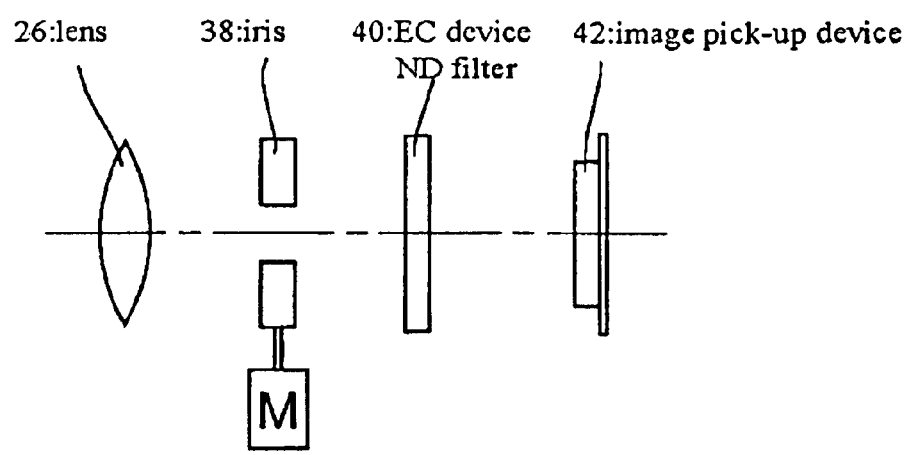
FIG. 8 is a schematic view illustrating an example for arranging important portions of an optical system when the EC device shown in FIG. 1 is used in a digital camera.

As described above, since in the EC device shown in FIG. 1, the color during the coloring mode was a transmitting color of gray and the color during the bleaching mode was almost transparent transmitting color of an achromatic color. Thus, this EC device is very suitably adapted to prevent the color of image obtained through the EC device from changing. An example for arranging important portions of an optical system, when the EC device shown in FIG. 1 is employed in a digital camera (such as a still camera, or a video camera) is schematically shown in FIG. 8. On the optical axis extending from a lens 36 to an image pickup device 42 such as a CCD, a mechanical iris 38 is driven by a motor and a ND filter 40 of the EC device shown in FIG. 1 are sequentially arranged. The ND filter 40 of the EC device is fixed. When the brightness of a subject measured by a separately provided photometric element is within a predetermined value, the ND filter 40 of the EC device is bleached. Since during the bleaching mode, the average transmittance of the ND filter 40 of the EC device is about 80% in the visible light area, so the lack of exposure does not occur. Furthermore, since the transmitting color is achromatic and almost transparent, the picked-up image is not blue-based and it is easy to balance the white color. When the brightness of the subject is greater than the predetermined value and the iris 38 cannot properly adjust the exposure, a predetermined coloring voltage (for example, 2.0V) is applied to the ND filter 40 of the EC device undergoing the coloring state and then it performs a dimming. During the coloring mode, the average transmittance of the ND filter 40 of the EC device is about 20% in the visible light area and thus it can be sufficiently dimmed. Furthermore, since the transmitting color is gray, color reproducibility is good and the picked-up image is not blue-based. Thereafter, when the brightness of the subject is lower than the predetermined value, a predetermined bleaching voltage is applied to the ND filter 40 of the EC device (or, both electrodes are short-circuited) undergoing the bleaching state. Therefore, by replacing the conventional motor-driven ND filter with the ND filter 40 of the EC device, it is possible to simplify the mechanical structure and to achieve a smaller camera size, improve the design and lighten the weight. Furthermore, since motor driving is not needed continuously, less power can be consumed. Furthermore, since it is not necessary to detach the ND filter 40 of the EC device, the labor for the detaching operation is not required. In addition, the ND filter 40 of the EC device may be built in one eye reflex camera. Furthermore, since the ND filter 40 of the EC device is a complete solid type, leakage of liquid in destruction does not occur.

Furthermore, in the above example, although the adjustment in the coloring quantity of the ND filter 40 of the EC device is performed in a one-step (on/off) switching method of coloring and bleaching, the coloring quantity may be adjusted by a two or more steps or a zero-step switching method by adjusting the coloring voltage to set a two or more step switching or a zero-step switching (where the peak value of the coloring voltage is set to, for example, 1.75V or more and more preferably 2V or more). In case of such construction, the ND filter 40 of the EC device can combine the iris and thus it is possible to omit the mechanical iris 38, so the mechanical construction can be simplified.

In addition, the EC device shown in FIG. 1 can be used as the exposure adjusting element for a film-type camera as well as a digital camera. Furthermore, the EC device shown in FIG. 1 can be adapted to sunglasses, a dimming glass or a sunroof.

(Second Embodiment)

Figure 9:
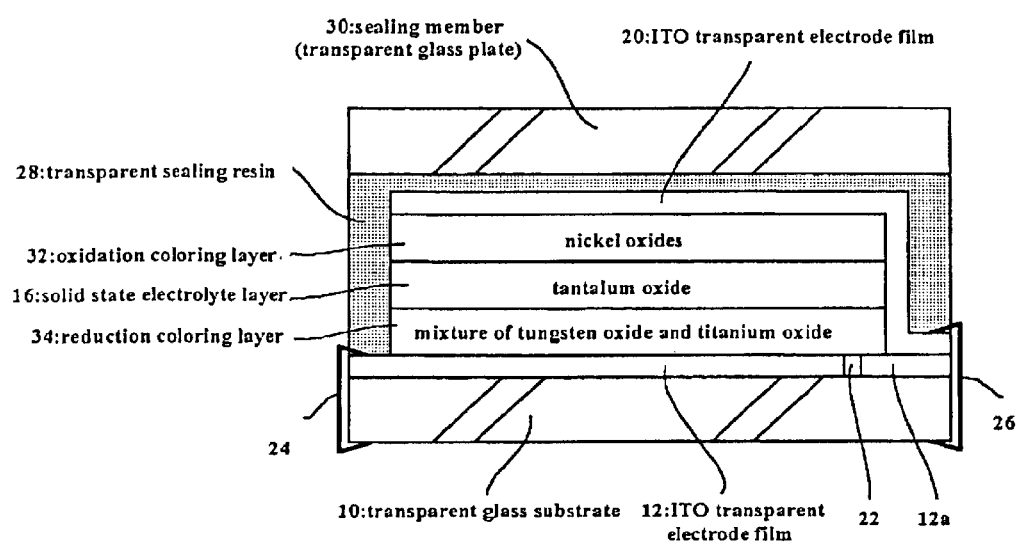
FIG. 9 is a schematic view illustrating a section of the laminated structure in the EC device according to the second embodiment of the present invention.

A second embodiment of the present invention is shown in FIG. 9. In this embodiment, positions of the nickel oxides film 32 constituting the oxidation coloring layer and the mixture film 34 of tungsten oxide and titanium oxide constituting the reduction coloring layer in the embodiment of FIG. 1 are exchanged. The same reference numerals are employed in portions equal to those in the embodiment of FIG. 1.

(Third Embodiment)

Figure 10:
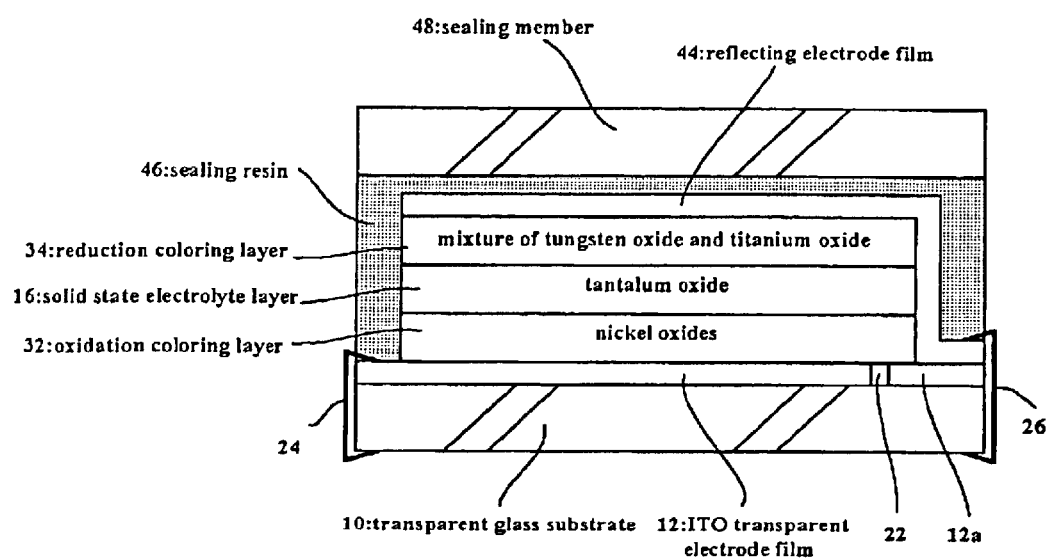
FIG. 10 is a schematic view illustrating a section of the laminated structure in the EC device according to the third embodiment of the present invention.

A third embodiment of the present invention is shown in FIG. 10. This constitutes a dimming rearview mirror for a vehicle etc. in which the substrate is a front surface. The same reference numerals are employed in portions equal to those in the embodiment shown in FIG. 1. An ITO transparent electrode film 12 constituting the lower electrode film is formed on the transparent glass substrate 10 and the nickel oxides film 32 constituting the oxidation coloring layer, the tantalum oxide film 16 constituting the solid-state electrolyte layer, the mixture film 34 of tungsten oxide and titanium oxide constituting the reduction coloring layer and a reflecting electrode film 44 of Al, Ni, Cr etc constituting a reflecting film which also serves as the upper electrode film are sequentially formed on the ITO transparent electrode film 12. An end portion of the lower ITO transparent electrode film 12 is previously provided with a partition 22 using a laser etching and an area 12a of the end portion is electrically isolated. An end portion of the reflecting film which also serves as the upper electrode film 44 is electrically connected to the isolated area 12a of the lower ITO transparent electrode film 12. Both end portions of the substrate 10 are provided with clip electrodes 24, 26 for drawing electrodes. The clip electrode 24 is electrically connected to the lower ITO transparent electrode film 12 and the clip electrode 26 is electrically connected to the reflecting film which also serves as the upper electrode film 44. A liquid-state sealing resin 46 is applied on the reflecting film which also serves as the upper electrode film 44, a plate-shaped member such as a glass plate, a resin plate, a metal plate etc. is adhered thereon as a sealing member 48 and then the liquid-state sealing resin 46 is cured to seal the entire laminated structure. In the construction above, the EC device shown in FIG. 10 constructs the dimming rearview mirror in which the transparent glass substrate 10 is a front surface, has gray color with a low reflectivity during the coloring mode and has an achromatic color with a high reflectivity during the bleaching mode.

(Fourth Embodiment)

Figure 11:
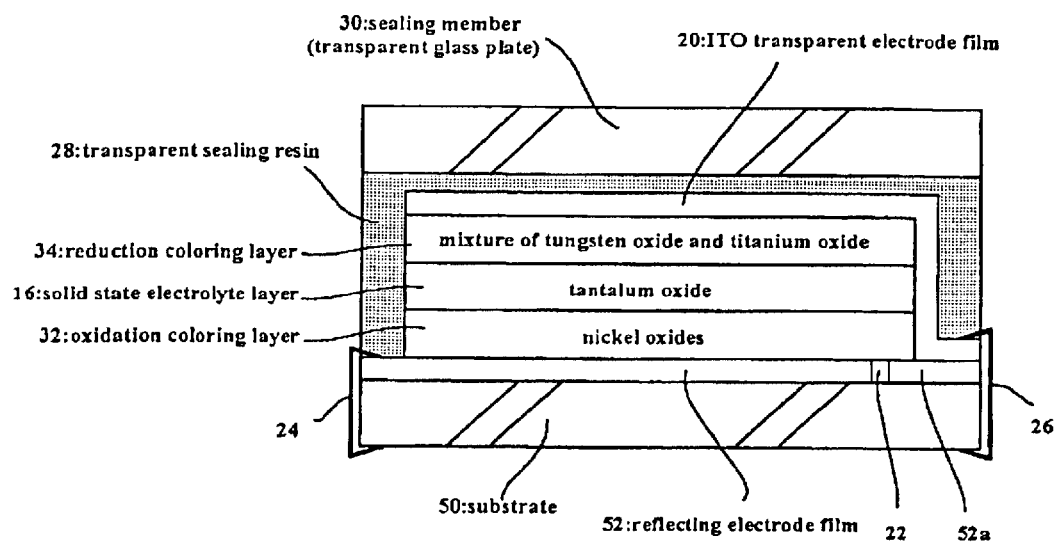
FIG. 11 is a schematic view illustrating a section of the laminated structure in the EC device according to the fourth embodiment of the present invention.
Figure 1:
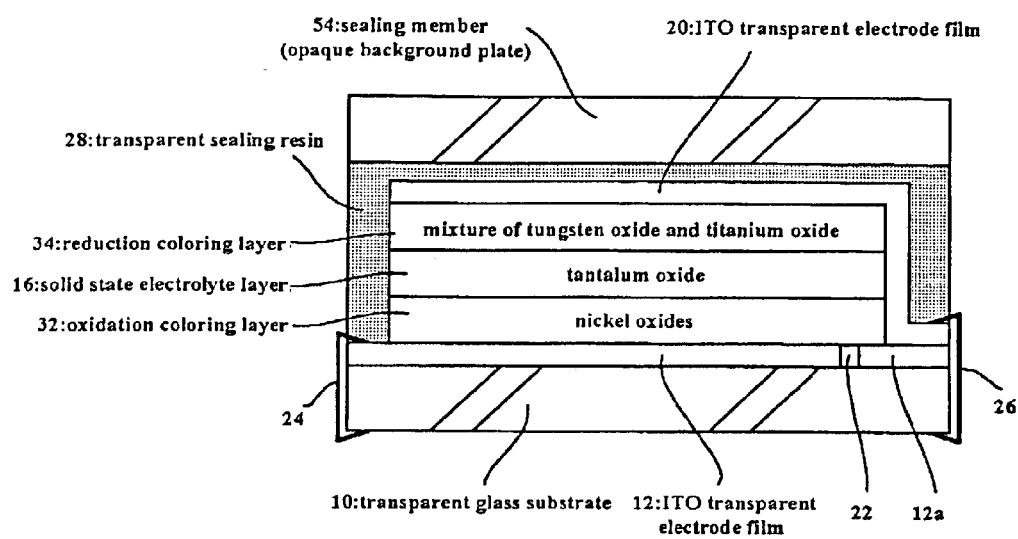

A fourth embodiment of the present invention is shown in FIG. 11. This constitutes a dimming rearview mirror for a vehicle etc. in which the sealing member is a front surface. The same reference numerals are employed in portions equal to those in the embodiments shown in FIGS. 1 and 10. A reflecting electrode film 52 constituting a reflecting film which also serves as the lower electrode film is formed on a glass substrate 50 etc. and the nickel oxides film 32 constituting the oxidation coloring layer, the tantalum oxide film 16 constituting the solid-state electrolyte layer, the mixture film 34 of tungsten oxide and titanium oxide constituting the reduction coloring layer and the ITO transparent electrode film 20 constituting the upper electrode film are sequentially formed on the reflecting electrode film 52. It is preferable that the reflecting electrode film 52 is made of a metal material which is not corroded during a process for evaporating an upper layer. An end portion of the reflecting electrode film 52 is previously provided with a partition 22 using a laser etching, and the area 52a of the end portion is electrically isolated. An end portion of the upper ITO transparent electrode film 20 is electrically connected to the isolated area 52a of the reflecting electrode film 52. Both end portions of the substrate 50 are provided with the clip electrodes 24, 26 for drawing electrodes. The clip electrode 24 is electrically connected to the reflecting electrode film 52 and the clip electrode 26 is electrically connected to the upper transparent electrode film 20. A transparent liquid-state sealing resin 28 is applied on the upper ITO transparent electrode film 20, a transparent glass plate is adhered thereon as a sealing member 30 and then the liquid-state sealing resin 28 is cured to seal the entire laminated structure. In the construction above, the EC device shown in FIG. 11 constructs the dimming rearview mirror in which the transparent sealing resin 28 is a front surface, has gray color with a low reflectivity during the coloring mode and has an achromatic color with a high reflectivity during the bleaching mode.

(Fifth Embodiment)

A fifth embodiment of the present invention is shown in FIG. 12. This constitutes a display device in which the substrate is a front surface. The same reference numerals are employed in portions equal to those in the embodiment shown in FIG. 1. An ITO transparent electrode film 12 constituting the lower electrode film is formed on the transparent glass substrate 10 and, the nickel oxides film 32 constituting the oxidation coloring layer, the tantalum oxide film 16 constituting the solid-state electrolyte layer, the mixture film 34 of tungsten oxide and titanium oxide constituting the reduction coloring layer and the ITO transparent electrode film 20 constituting the upper electrode film are sequentially formed on the ITO transparent electrode film 12. An end portion of the lower ITO transparent electrode film 12 is previously provided with the partition 22 using the laser etching, and the area 12a of the end portion is electrically isolated. An end portion of the upper ITO transparent electrode film 20 is electrically connected to the isolated area 12a of the lower ITO transparent electrode film 12. Both end portions of the substrate 10 are provided with the clip electrodes 24, 26 for drawing electrodes. The clip electrode 24 is electrically connected to the lower ITO transparent electrode film 12 and the clip electrode 26 is electrically connected to the upper ITO transparent electrode film 20. Further, the upper and lower ITO transparent electrode films 12, 20 are patterned to display any character, symbol, picture etc. The transparent liquid-state sealing resin 28 is applied on the upper ITO transparent electrode film 12, an opaque background plate such as a white glass plate is adhered thereon as the sealing member 54 and then the liquid-state sealing resin 28 is cured to seal the entire laminated structure. In the construction above, the EC device shown in FIG. 12 constructs the display device in which the transparent glass substrate 10 is a front surface. In this case, since the display color is gray, display without incongruity can be realized compared to the conventional blue-based color display. Furthermore, when this display device is used for a dial plate or clock of a segment or a dot matrix type, since the bleaching portion is achromatic in color and almost transparent, the display can be easily recognized.

(Sixth Embodiment)

Figure 13:
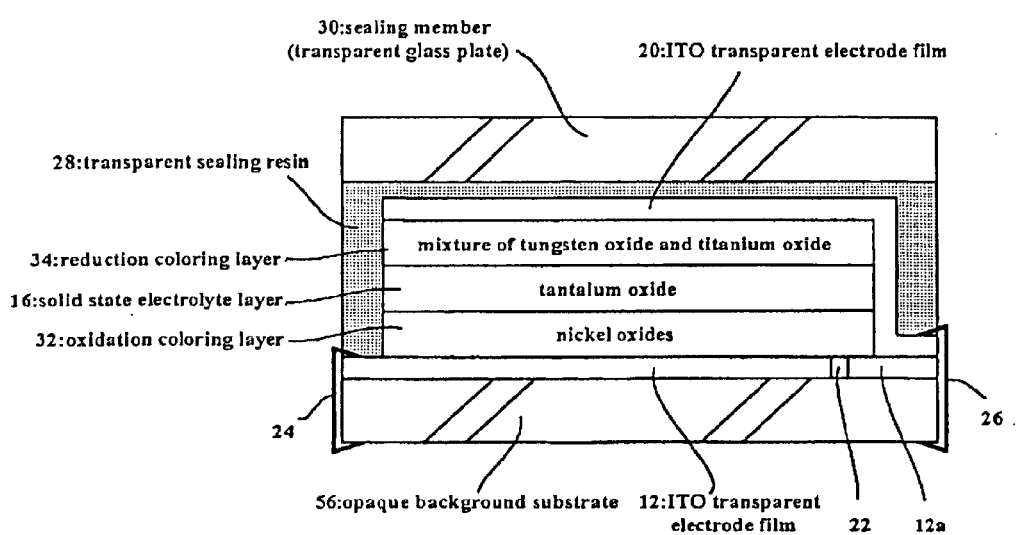
FIG. 13 is a schematic view illustrating a section of the laminated structure in the EC device according to the sixth embodiment of the present invention.

A sixth embodiment of the present invention is shown in FIG. 13. This constitutes a display device in which the sealing member is a front surface. The same reference numerals are employed in portions equal to those in the embodiments shown in FIGS. 1 and 12. An ITO transparent electrode film 12 constituting the lower electrode film is formed on an opaque background substrate 56 such as a white glass plate etc. and, the nickel oxides film 32 constituting the oxidation coloring layer, the tantalum oxide film 16 constituting a solid-state electrolyte layer, the mixture film 34 of tungsten oxide and titanium oxide constituting the reduction coloring layer and the ITO transparent electrode film 20 constituting the upper electrode film are sequentially formed on the ITO transparent electrode film 12. An end portion of the lower ITO transparent electrode film 12 is previously provided with the partition 22 using the laser etching, and the area 12a of the end portion is electrically isolated. An end portion of the upper ITO transparent electrode film 20 is electrically connected to the isolated area 12a of the lower ITO transparent electrode film 12. Both end portions of the substrate 56 are provided with the clip electrodes 24, 26 for drawing electrodes. The clip electrode 24 is electrically connected to the lower ITO transparent electrode film 12 and the clip electrode 26 is electrically connected to the upper ITO transparent electrode film 20. Further, the upper and lower ITO transparent electrode films 12, 20 are patterned to display any character, symbol, picture etc. The transparent liquid-state sealing resin 28 is applied on the upper ITO transparent electrode film 12, a transparent glass plate is adhered thereon as the sealing member 30 and then the liquid-state sealing resin 28 is cured to seal the entire laminated structure. In the construction above, the EC device shown in FIG. 13 constitutes the display device in which the sealing member 30 is a front surface. In this case, since the display color is gray, display without incongruity can be realized compared to the conventional blue-based color display. Furthermore, when this display device is used for a dial plate or clock of a segment or a dot matrix type, since the bleaching portion is achromatic in color and almost transparent, the display can be easily recognized.

Furthermore, in the third to sixth embodiments, positions of the nickel oxides film 32 constituting the oxidation coloring layer and the mixture film 34 of tungsten oxide and titanium oxide constituting the reduction coloring layer may be exchanged. Furthermore, although the solid-state electrolyte layer 16 is made of $Ta_2O_5$ in the respective embodiments described above, other solid inorganic electrolyte materials (for example, $SiO_2$, $MgF_2$, $Sb_2O_5$, $ZrO_2$ etc.) may be used.

(Seventh Embodiment)

Figure 14:
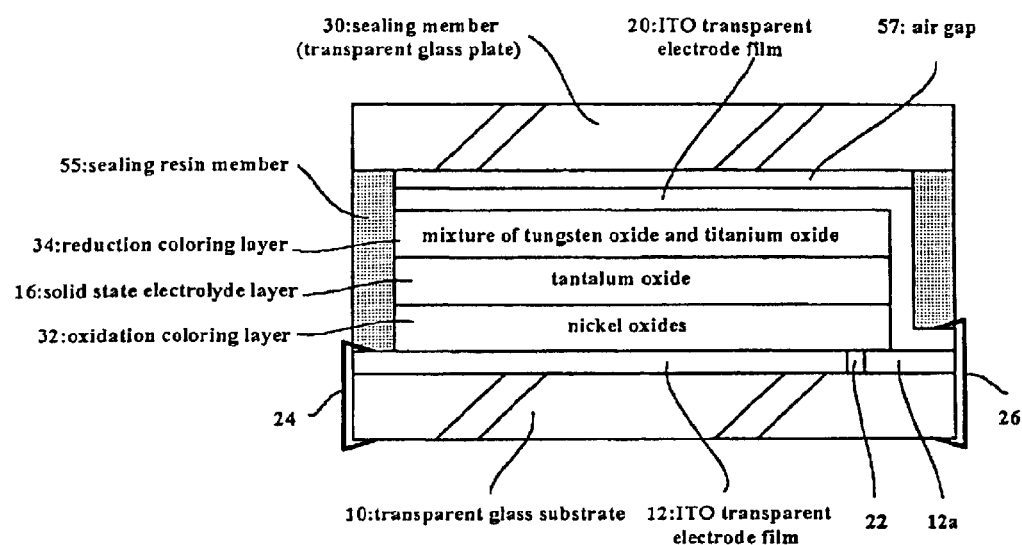
FIG. 14 is a schematic view illustrating a section of the laminated structure in the EC device according to the seventh embodiment of the present invention.

A seventh embodiment of the present invention is shown in FIG. 14. This embodiment is constructed by replacing the liquid-state sealing resin 28 in the structure shown in FIG. 1 with a solid-state sealing resin member. After the laminated structure of the oxidation coloring layer 32, the solid electrolyte layer, the reduction coloring layer 34 and the upper ITO transparent electrode film 20 is formed on the transparent glass substrate 10 onto which the lower ITO transparent electrode film 12 has been adhered, as the solid-state sealing resin member, a ring-shaped sealing resin member 55 surrounds the laminated structure, the lower surface of the ring-shaped sealing resin member 55 is adhered to the transparent glass substrate 10, and then the upper surface of the ring-shaped sealing resin member 55 is adhered to the sealing member 30, so that the entire structure forms a body. An air gap (air layer) 57 may be formed between the upper ITO transparent electrode film 20 and the sealing member 30.

(Eighth Embodiment)

Figure 15:
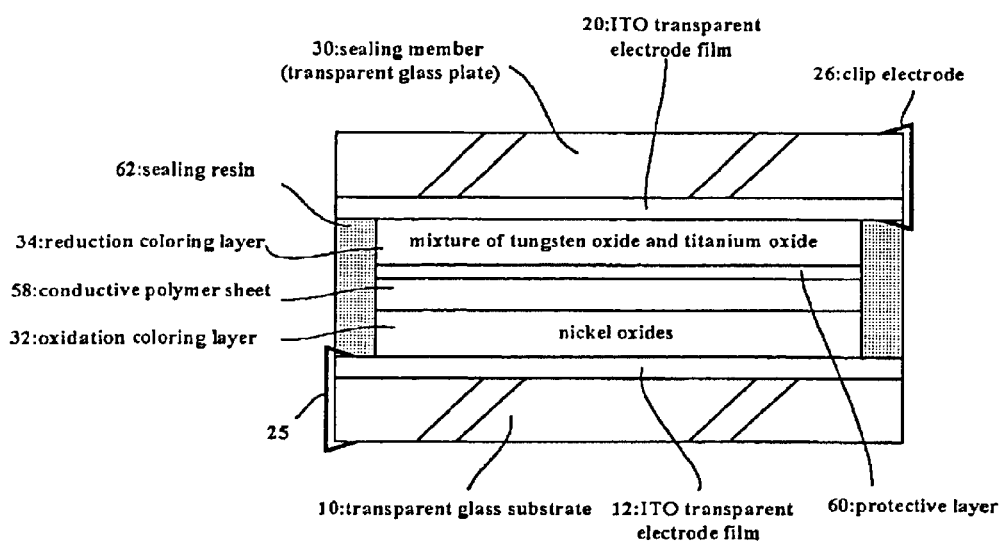
FIG. 15 is a schematic view illustrating a section of the laminated structure in the EC device according to the eighth embodiment of the present invention.
Figure 1:
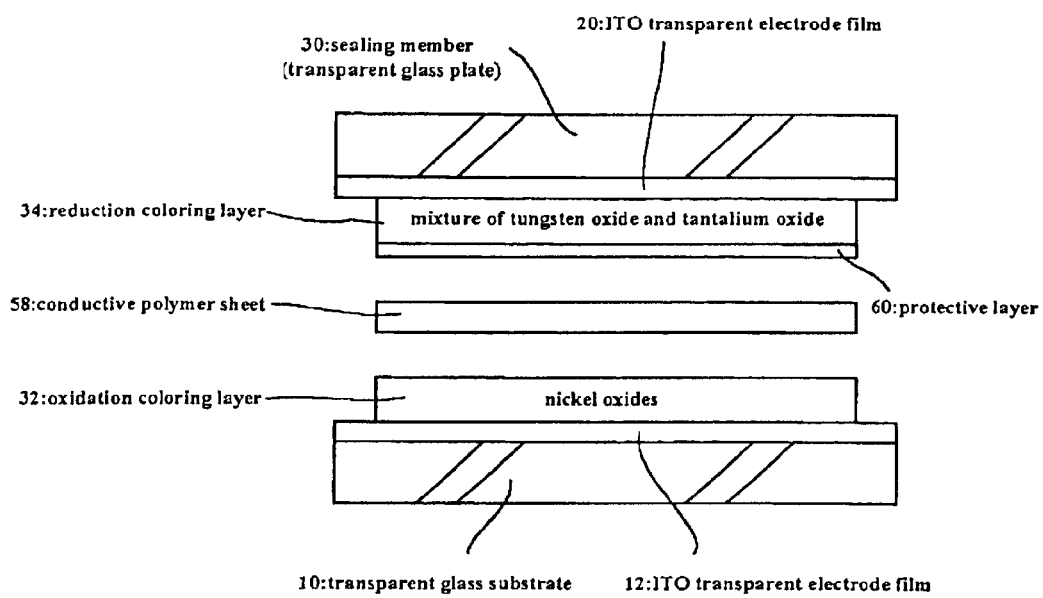

An eighth embodiment of the present invention is shown in FIG. 15. In this embodiment, the solid electrolyte layer 16 is made of a solid polymer electrolyte material (conductive polymer sheet) instead of the solid inorganic electrolyte material in the structure shown in FIG. 1. The same reference numerals are used for the portions common to the embodiment shown in FIG. 1. This EC device is constructed by laminating the oxidation coloring layer 32 composed nickel oxides, the conductive polymer sheet 58, a protective layer 60 and the reduction coloring layer 34 composed the mixture of tungsten oxide and titanium oxide, between the upper and lower ITO transparent electrode film 20, 12. The protective layer 60 is for protecting the mixture film of tungsten oxide and titanium oxide constituting the reduction coloring layer 34. The sealing resin 62 is applied to the entire outer circumferential edge of the laminated structure composed the oxidation coloring layer 32, the conductive polymer sheet 58, the protective layer 60 and the reduction coloring layer 34, and is cured to seal the laminated body. The clip electrode 26 to be electrically connected to the upper ITO transparent electrode film 20 is provided on a side of the sealing member 30.

An example of the method of manufacturing the EC device will be described in order with reference to FIG. 16.

(1) Two sheets of transparent glass plates with a predetermined shape on which the ITO transparent electrode film has been formed are prepared as the transparent glass substrate 10 onto which the lower ITO transparent electrode film 12 has been adhered and the sealing member 30 onto which the upper ITO transparent electrode film 20 has been adhered, respectively.

(2) The substrate 10 is placed inside the vacuum evaporation apparatus and then using the vacuum evaporation method which uses NiO or Ni as an evaporating material (starting material), the nickel oxides film 32 is formed.

(3) The substrate 10 is removed from the vacuum evaporation apparatus, the sealing member 30 is placed inside the vacuum evaporation apparatus, and by means of the dual vacuum evaporation method which uses $WO_3$ and $TiO_2$ as the evaporating materials, the mixture film 34 of tungsten oxide and titanium oxide is formed.

(4) Subsequently, the protective layer 60, for example, $Ta_2O_5$ film for the mixture film 34 of tungsten oxide and titanium oxide, is formed on the surface of the mixture film 34 of tungsten oxide and titanium oxide.

(5) The sealing member 30 is removed from the vacuum evaporation apparatus, and the substrate 10 and the sealing member 30 are provided with the clip electrodes 24, 26, respectively.

(6) The substrate 10 and the sealing member 30 are arranged face up and face down, respectively and attached closely to the conductive polymer sheet 58.

(7) The liquid-state sealing resin is applied to the entire outer circumferential edge of the laminated structure and cured to seal the laminated structure, so the entire structure is made into a body.

(Ninth Embodiment)

Figure 17:
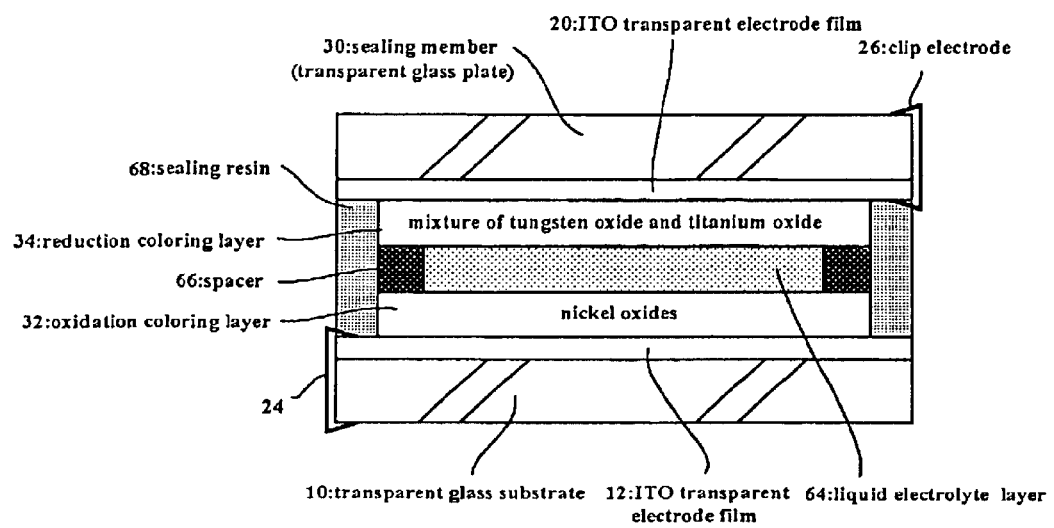
FIG. 17 is a schematic view illustrating a section of the laminated structure in the EC device according to the ninth embodiment of the present invention.

A ninth embodiment of the present invention is shown in FIG. 17. This embodiment is constructed by replacing the solid electrolyte layer 16 in the structure shown in FIG. 1 with a liquid electrolyte layer. The same reference numerals are used for the portions common to the embodiment shown in FIG. 1. This EC device is constructed by laminating the oxidation coloring layer 32 composed nickel oxides, a liquid electrolyte layer 64 and the reduction coloring layer 34 composed the mixture of tungsten oxide and titanium oxide, between the upper and lower ITO transparent electrode films 20, 12. A spacer 66 is inserted into the liquid electrolyte layer 64. The sealing resin 68 is applied to the entire outer circumferential edge of the laminated structure composed the oxidation coloring layer 32, the liquid electrolyte layer 64 and the reduction coloring layer 34, and is cured to seal the laminated structure. The clip electrode 26 to be electrically connected to the upper ITO transparent electrode film 20 is provided on the side of the sealing member 30.

Figure 18:
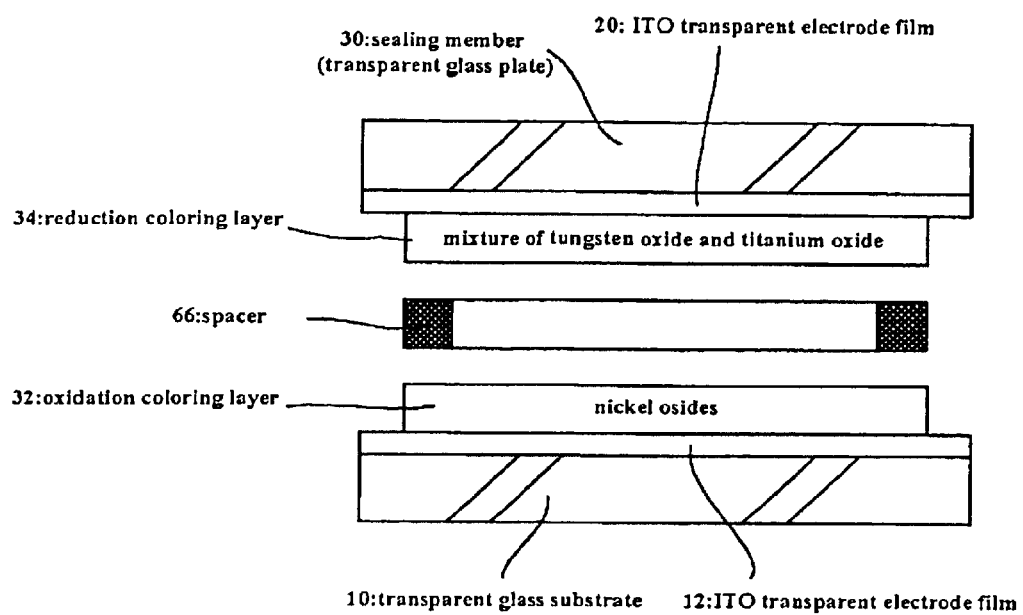
FIG. 18 is a schematic view illustrating a method of manufacturing the EC device of the ninth embodiment.

An example of the method of manufacturing the EC device will be described in order with reference to FIG. 18.

(1) Two sheets of transparent glass plates with a predetermined shape on which the ITO transparent electrode film has been formed are prepared as the transparent glass substrate 10 onto which the lower ITO transparent electrode film 12 has been adhered and the sealing member 30 onto which the upper ITO transparent electrode film 20 has been adhered, respectively.

(2) The substrate 10 is placed inside the vacuum evaporation apparatus and then by means of the vacuum evaporation method which uses NiO or Ni as the evaporating material (starting material), the nickel oxides film 32 is formed.

(3) The substrate 10 is removed from the vacuum evaporation apparatus, the sealing member 30 is placed inside the vacuum evaporation apparatus, and by means of the dual vacuum evaporation method which uses $WO_3$ and $TiO_2$ as the evaporating materials, the mixture film 34 of tungsten oxide and titanium oxide is formed.

(4) The sealing member 30 is removed from the vacuum evaporation apparatus and the substrate 10 and the sealing member 30 are provided with the clip electrodes 24, 26, respectively.

(5) The laminated surfaces of substrate 10 and the sealing member 30 are arranged face up and face down respectively to the spacer 66, and the air gap for forming the liquid electrolyte layer 64 is formed.

(6) The liquid-state sealing resin 68 is applied to the entire outer circumferential edge of the laminated structure except on a liquid inlet (not shown) and cured to form the entire structure into a body.

(7) The liquid electrolyte is injected through the liquid inlet to form the liquid electrolyte layer 64.

(8) The liquid inlet is closed by the liquid-state sealing resin and cured to reach completion.

Furthermore, in the above embodiment, the mixture film of tungsten oxide and titanium oxide has been formed by means of the dual vacuum evaporation method which uses $WO_3$ and $TiO_2$ as the evaporating materials. However, a mixture material of $WO_3$ and $TiO_2$ with a predetermined mixture ratio may be prepared in advance and then the mixture film of tungsten oxide and titanium oxide may be formed using the sputtering method which uses them as a target material (starting material). Furthermore, in the above embodiment, although the nickel oxides film constituting the oxidation coloring layer has been formed by means of the vacuum evaporation method, the nickel oxides film may be formed by means of the sputtering method which uses NiO or Ni as the target material (starting material). When Ni is used as the target material, the scattered Ni combines with oxygen in air within the vacuum chamber to form nickel oxides. Furthermore, in the above embodiment, although the oxidation coloring layer is comprised of the nickel oxides, the oxidation coloring layer may contain the nickel oxides as its main component, other materials except for nickel oxides may be added to the oxidation coloring layer within a range where the color of the entire device does not depart from gray during the coloring mode, Furthermore, in the aforementioned embodiment, although the reduction coloring layer is comprised of the mixture of tungsten oxide and titanium oxide, the reduction coloring layer may consist of the material containing the tungsten oxide as its main component and the titanium oxide as an additive, other materials may be added to the reduction coloring layer within a range where the color of the entire device does not depart from gray during the coloring mode,.

Although the present invention has been described in connection with the preferred embodiments with reference to the accompanying drawings, the preferred embodiments are intended not to limit the invention, but to exemplify the best modes of the present invention. It should be understood by those skilled in the art that various changes or modifications may be made thereto without departing from the spirit and scope of the invention. Therefore, the present invention is defined only by the appended claims which should be construed as covering such changes or modifications.

What is claimed is:

1. An electrochromic device comprising:
   a reduction coloring layer made of a material containing tungsten oxide and titanium oxide;
   an oxidation coloring layer made of a material containing nickel oxides;
   an electrolyte layer sandwiched between the reduction coloring layer and the oxidation coloring layer; and
   a number of tungsten atoms contained in the reduction coloring layer being greater than a number of titanium atoms contained in the reduction coloring layer such that a color of the electrochromic device is gray during a coloring mode.

2. The electrochromic device according to claim 1, wherein said reduction coloring layer is a film made of a mixture containing tungsten oxide and titanium oxide as main components or a film made of a mixture containing tungsten oxide as a main component and titanium oxide as an additive, and said oxidation coloring layer is a film containing nickel oxides as a main component.

3. The electrochromic device according to claim 1, wherein a ratio of the number of titanium atoms to a sum of the number of tungsten atoms and the number of titanium atoms is at least 5% and at most 40%.

4. The electrochromic device according to claim 3, wherein the ratio is at least 20% and at most 30%.

5. The electrochromic device according to claim 1, wherein said tungsten oxide contains $WO_3$ as a main component, said titanium oxide contains $TiO_2$ as a main component and said nickel oxides contains NiO as a main component.

6. The electrochromic device according to claim 1, wherein said nickel oxides contains $Ni(OH)_2$.

7. The electrochromic device according to claim 1, wherein said reduction coloring layer is amorphous and said oxidation coloring layer is crystalline, fine-crystalline or amorphous.

8. The electrochromic device according to claim 1, wherein said reduction coloring layer is configured to perform reactions expressed by at least one of following formulas 1 and 2 by applying voltage, and wherein said oxidation coloring layer is configured to perform reactions expressed by at least one of following formulas 3, 4 and 5:

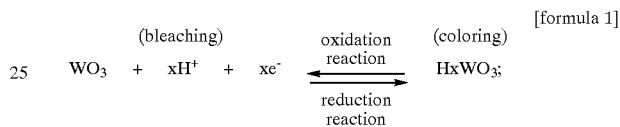

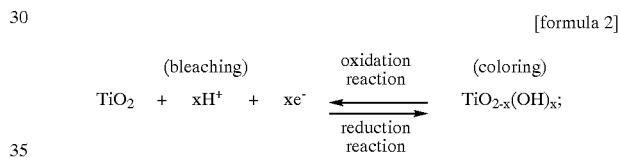

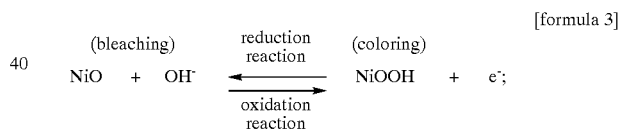

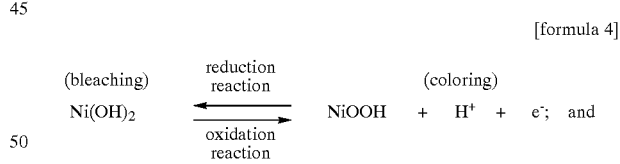

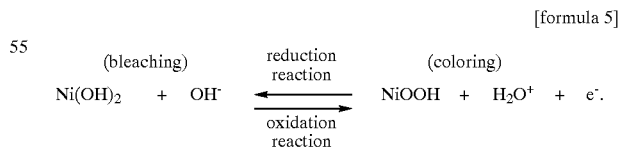

9. The electrochromic device according to claim 1, wherein said reduction coloring layer contains a component of a film formed from a dual evaporation method which uses $WO_3$ and $TiO_2$ as a starting materials, and said oxidation coloring layer contains a component of a film formed from an evaporation method which uses NiO as a starting material.

10. The electrochromic device according to claim 1, wherein a peak value of voltage applied during the coloring mode is 1.75 V or more.

11. The electrochromic device according to claim 1, wherein a peak value of voltage applied during the coloring mode is 2 V or more.

12. The electrochromic device according to claim 1, wherein a color during a bleaching mode is an achromatic color.

13. An electrochromic device comprising:

a first plate member;

a first electrode layer provided on the first plate member;

an oxidation coloring layer provided on the first electrode layer and made of a material containing nickel oxides;

an electrolyte layer provided on the oxidation coloring layer;

a reduction coloring layer provided on the electrolyte layer and made of a material containing tungsten oxide and titanium oxide;

a second electrode layer provided on the reduction coloring layer;

a second plate member provided on the second electrode layer;

at least one of a first combination of the first electrode layer and the first plate member and a second combination of the second electrode layer and the second plate member being transparent; and a number of tungsten atoms contained in the reduction coloring layer being greater than a number of titanium atoms contained in the reduction coloring layer such that a color of the electrochromic device is gray during a coloring mode.

14. The electrochromic device according to claim 13, wherein all of the first electrode layer, the first plate member, the second electrode layer and the second plate member are transparent.

15. The electrochromic device according to claim 14, wherein the electrochromic device is utilized as an exposure control element on an optical axis of an image pickup device in a digital camera.

16. The electrochromic device according to claim 13, wherein one of the first combination of the first electrode layer and the first plate member and the second combination of the second electrode layer and the second plate member is transparent, and wherein an electrode layer of another of the first combination and the second combination is made of a metal reflecting film.

17. The electrochromic device according to claim 16, wherein the electrochromic device is utilized to constitute a reflectivity-variable mirror.

18. The electrochromic device according to claim 13, wherein the electrolyte layer is a solid-state electrolyte layer.

19. The electrochromic device according to claim 13, further comprising:

a base member on which one of the first plate member and the second plate member is provided.

20. The electrochromic device according to claim 19, further comprising:

a sealing resin adhered to another of the first plate member and the second plate member.

21. The electrochromic device according to claim 20, wherein all of the base member, the sealing resin, the first electrode layer, the first plate member, the second electrode layer and the second plate member are transparent.

22. The electrochromic device according to claim 21, wherein the electrochromic device is utilized as an exposure control element on an optical axis of an image pickup device in a digital camera.

23. The electrochromic device according to claim 20, wherein the first plate member is provided on the base member, the sealing resin is adhered to the second plate member, one of a third combination of the base member, the first electrode layer and the first plate member and a fourth combination of the sealing resin, the second electrode layer and the second plate member is transparent, and an electrode layer of another of the third combination and the fourth combination is made of a metal reflecting film.

24. The electrochromic device according to claim 23, wherein the electrochromic device is utilized to constitute a reflectivity-variable mirror.

25. The electrochromic device according to claim 13, wherein said reduction coloring layer is a film made of a mixture containing tungsten oxide and titanium oxide as main components or a film made of a mixture containing tungsten oxide as a main component and titanium oxide as an additive, and said oxidation coloring layer is a film containing nickel oxides as a main component.

* * * * *